United States Patent [19]

Whelan

[11] Patent Number: 5,058,441

[45] Date of Patent: Oct. 22, 1991

[54] SAFETY PIPETTE AND ADAPTOR TIP

[75] Inventor: James P. Whelan, Damascus, Md.

[73] Assignee: The United States of America as represented by the Department of Health and Human Services, Washington, D.C.

[21] Appl. No.: 451,689

[22] Filed: Dec. 18, 1989

[51] Int. Cl.[5] .......................... G01N 1/14; B01L 3/02

[52] U.S. Cl. .............................. 73/864.15; 73/863.23; 73/864.01; 73/864.14

[58] Field of Search ........... 73/864.01, 864.03, 864.11, 73/864.13, 864.14, 864.15, 863.23, 863.24, 863.25

[56] References Cited

U.S. PATENT DOCUMENTS

| | | | |
|---|---|---|---|
| 2,153,105 | 4/1939 | Szécsi | 73/864.11 |
| 2,348,831 | 5/1944 | Mathis | 222/189 |
| 2,376,231 | 5/1945 | Cohn | 222/478 |
| 2,423,173 | 7/1947 | Brady et al. | 222/189 |
| 2,692,503 | 10/1954 | Crecelius . | |
| 2,930,238 | 3/1960 | Kelleett . | |
| 3,166,940 | 1/1965 | Allisbaugh et al. | 73/864.03 |
| 3,463,013 | 8/1969 | Reedy | 73/864.15 |
| 3,591,056 | 7/1971 | Griffin | 73/864.18 |
| 3,864,979 | 2/1975 | Ares | 55/159 X |
| 3,933,048 | 1/1976 | Scordato | 73/864.17 |
| 3,963,061 | 6/1976 | Kenney | 73/864.15 X |
| 3,995,496 | 12/1976 | Bickford | 137/199 X |
| 4,283,950 | 8/1981 | Tervamäki | 73/864.14 |
| 4,299,795 | 11/1981 | Bates | 73/864.01 |
| 4,461,328 | 7/1984 | Kenney | 73/864.02 X |
| 4,476,016 | 10/1984 | Kiyasu | 422/70 X |
| 4,589,421 | 5/1986 | Ullman | 128/763 |
| 4,806,313 | 2/1989 | Ebersole et al. | 422/100 X |

FOREIGN PATENT DOCUMENTS

| | | | |
|---|---|---|---|
| SC13272 | 5/1956 | Fed. Rep. of Germany | 73/864.01 |
| 297895 | 3/1971 | U.S.S.R. | 73/864.01 |
| 680383 | 10/1952 | United Kingdom | 73/864.15 |

*Primary Examiner*—Tom Noland
*Attorney, Agent, or Firm*—Lowe, Price, Lebanc & Becker

[57] ABSTRACT

A disposable pipette comprises a tube having first and second ends, a porous barrier plug mounted in the tube at the second end, and a sealing device mounted in the tube between the second end and the barrier plug. The sealing device has a closed position and an open position into which it must be forced. The pipette further comprises a closure mounted in the tube between the second end and the sealing device, wherein the first end is immersed in a fluid, when the sealing device is forced to the open position and when the second end is connected to a suction, fluid is suctioned into the pipette. A safety pipette adaptor comprises an annular sleeve for mounting on the suction end of a pipette. A rod is provided in the sleeve in the direction of an axis for insertion into a pipette or pipette insert and is capable of displacing a sealing device in a pipette or pipette insert into an open position. A disposable pipette insert comprises a tube having first and second ends and sealably fitting in the suction end of a pipette with the second end of the tube being flush with the pipette's suction end, a porous barrier plug mounted in the tube at the first end, and a sealing device mounted in the tube between the second end and the barrier plug. The sealing device has a closed position and an open position into which it must be forced. The pipette further includes a closure mounted in the tube at a position between the second end and the sealing device, wherein when the sealing device is forced into the open position, air can flow in and out of the tube.

19 Claims, 2 Drawing Sheets

SAFETY PIPETTE AND ADAPTOR TIP

TECHNICAL FIELD

This invention relates to a safety pipette and an adaptor tip which do not permit mouth pipetting. The present invention helps to eliminate any risk of self-contamination or exposure of personnel to substances normally transferred by pipetting.

BACKGROUND ART

Current technology lies in a plethora of pipettes such as plastic, glass, serological, Pasteur, transfer pipets and the like, which are manufactured by various companies, including Becton-Dickinson, Corning, Fisher, Bel-Art, Kimble, Wheaton, and many others.

U.S. Pat. No. 2,930,238 to Kellett discloses a pipette which prevents liquid in the pipette from reaching the user's mouth. In this device a ball is provided which floats upwards on the drawn liquid to seal the mouthpiece.

U.S. Pat. No. 4,461,328 to Kenney discloses a pipette device for multiple pipetting which has a hydrophobic sheet to prevent fluid from traversing to far up the tube. The device can be applied to a manifold for applying a vacuum pressure to pipette tubes through filter paper.

U.S. Pat. No. 4,299,795 to Bates discloses a pipette or sample tube for obtaining a column of liquid at a predetermined height in laboratory applications. Movable valve members such as lead shot are located in the tube between the restriction and the opposite end for cooperating with the restriction to retain a column of liquid at the level of the valve member and restriction by surface tension effects. Liquid is drawn from the tube by suction to a level substantially above the restriction and when the suction is removed, the liquid is allowed to drain out the end by reason of the imperfect seal formed by the led shot at the restriction.

U.S. Pat. No. 3,864,979 to Ayres discloses a liquid collection tube such as a blood sedimentation tube which is provided with a barrier plug which will permit air passage but prevents liquid passage beyond the bottom of the barrier plug.

U.S. Pat. No. 2,348,831 to Mathis discloses a safety device for pipettes to prevent liquid from being drawn by suction into the mouth. A safety device 11 is provided for automatically preventing liquid drawn into the tube from coming into contact with the mouth of the user. The device 11 is a member attached to one end of the pipette and provided with a mount piece at the other end. The device is structured so that suction may be created in the pipette and air is permitted to pass but not liquid.

U.S. Pat. No. 2,376,231 to Cohn discloses a pipette of the throw-away type, the pipette being packet at its upper end with a cotton filter to prevent passage of bacteria from the mouth of the user into the liquid in the pipette or vice versa.

U.S. Pat. No. 2,423,173 to Brady et al. discloses a safety pipette adapted to pick up liquid by oral suction comprising a tubular member having a barrier member within an enlarged portion. The barrier member is pervious to air when dry and impervious to air and liquid when wet.

U.S. Pat. No. 2,692,503 to Crecelius discloses a pipette for use in laboratory work. The pipette is provided with a constriction near the mouth piece to separate the mouthpiece from the main body of the pipette. The restriction is also to prevent the displacement of a cotton plug which is in place to prevent passage of bacteria into the mouth of the person using the pipette.

U.S. Pat. No. 3,995,496 to Bickford discloses a disposable mouthguard for pipettes to prevent the flow of liquid into the user's mouth. The structure of this device is as shown in the drawings.

U.S. Pat. No. 4,589,421 to Ullman discloses a sampling device comprising a collection tube having a capillary passage. The capillary passage has a collecting and dispensing orifice at one end and a second orifice at the other end. A chamber encloses the second orifice. The device has a small opening to the outside atmosphere which is other than the first orifice, and which also communicates with the capillary tube. Also included are non-compressible means movable with respect to the opening for sealing the opening and forcing air from the chamber through the capillary tube.

All currently available pipettes have the same inherent flaw. The user can mouth pipette with them.

Although common sense dictates against mouth pipetting and the National Institutes of Health (NIH) guidelines, among .others, prohibit it, this practice still occurs in most laboratories. The relative inconvenience of obtaining an automatic or manual pipetting device to provide suction for pipettes as well as a lack of common sense always results in some users' disregard for existing regulations. This is especially true when the user believes that the liquid to be transferred is innocuous. However, the possibility of mislabeling of bottles and/or misreading of labels is the reason that mouth pipetting is discouraged.

Moreover, accidents happen even in the hands of experienced workers, and in many instances, according to the NIH Chemical Safety Office, liability for these accidents may reside with supervisory personnel. This liability may exist even if the worker disregards specific instructions to the contrary and then an accident occurs.

For these reasons, the availability of a pipette which cannot be used for mouth pipetting removes the possibility of accidents while eliminating the onus of liability.

DISCLOSURE OF THE INVENTION

This invention relates to a disposable pipette comprising a translucent tube provided with first and second ends, the first end being an elongated passageway of substantially smaller diameter than the tube and the second end positioned opposite the first end being vented to permit the passage of air in and out of the tube;

a porous barrier plug mounted in the tube at a position close to the second end thereof;

sealing means operably mounted in the tube at a position between the second end thereof and the barrier plug, said sealing means being capable of adopting at least a closed position, and an open position into which the sealing means must be forced to; and means for closing the sealing means, said closing means being mounted in the tube at a position between the second end thereof and the sealing means, wherein when the first end of the pipette is immersed in a fluid, the sealing means is forced to the open position and the second end is connected to a suction means the fluid is suctioned into the pipette.

This invention also relates to a safety pipette adaptor, comprising an annular sleeve having an internal diameter capable of being tightly mounted on the suction end of a pipette, said sleeve permitting the passage of air therethrough and being provided with a rod which is positioned in the direction of the sleeve's axis for insertion in the pipette, and being provided with a fitting for connecting to a suction means positioned opposite the rod.

Still part of this invention is a disposable pipette insert which comprises a translucent hollow tube provided with first and second ends, a length shorter than a pipette and an outer diameter permitting the tube to sealably fit first end in in the suction end of the pipette, with the second end of the tube being flush with said suction end;

a porous barrier plug mounted in the tube at a position close to the first end of the tube and held in such position;

sealing means operably mounted in the tube at a position between the second end thereof and the barrier plug, said sealing means being capable of adopting at least a closed position and an open position into which it must be forced; and means for closing the sealing means, said closing means being mounted in the tube at a position between the second end thereof and the sealing means, wherein when the sealing means is forced into the open position air can flow in and out of the tube.

Still part of this invention is a kit, comprising at least one disposable pipette insert comprising a translucent hollow tube provided with first and second ends, a length shorter than a pipette and an outer diameter permitting the tube to sealably fit first end in in the suction end of the pipette, with the second end of the tube being flush with said suction end, a porous barrier plug mounted in the tube at a position close to the first end of the tube and held in such position, sealing means operably mounted in the tube at a position between the second end thereof and the barrier plug, said sealing means being capable of adopting at least a closed position and an open position into which it must be forced; and means for closing the sealing means, said closing means being mounted in the tube at a position between the second end thereof and the sealing means, wherein when the sealing means is forced into the open position air can flow in and out of the tube; and at least one safety pipette adaptor comprising an annular sleeve having an internal diameter capable of being tightly mounted on the suction end of a pipette, said sleeve permitting the passage of air therethrough and being provided with a rod which is positioned in the direction of the sleeve's axis for insertion in the pipette, and being provided with a fitting for connecting to a suction means positioned opposite the rod, wherein the pipette insert and the pipette adaptor are of compatible sizes.

Also part of this invention is a kit, which comprises at least one safety pipette adaptor comprising an annular sleeve having an internal diameter capable of being tightly mounted on the suction end of a pipette, said sleeve permitting the passage of air therethrough and being provided with a rod which is positioned in the direction of the sleeve's axis for insertion in the pipette, and being provided with a fitting for connecting to a suction means positioned opposite the rod; and at least one disposable pipette comprising a translucent tube provided with first and second ends, the first end being an elongated passageway of substantially smaller diameter than the tube and the second end positioned opposite the first end being vented to permit the passage of air in and out of the tube, a porous barrier plug mounted in the tube at a position close to the second end thereof, sealing means operably mounted in the tube at a position between the second end thereof, and the barrier plug, said sealing means being capable of adopting at least a closed position, and an open position into which the sealing means must be forced to, and means for closing the sealing means, said closing means being mounted in the tube at a position between the second end thereof and the sealing means, wherein when the first end of the pipette is immersed in a fluid, the sealing means is forced to the open position and the second end is connection to a suction means the fluid is suctioned into the pipette, wherein the adaptor and the pipette are of compatible sizes.

A more complete appreciation of the invention and many of the attended advantages thereof will be readily perceived as the same becomes better understood by reference to the following detailed description when considered in connection with the accompanying figures.

Figure 1:
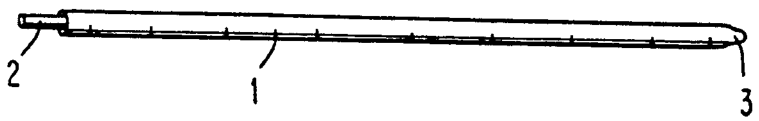
FIG. 1 is a horizontal view of a standard pipette (1) including the pipette insert of the invention (2).

Other objects, advantages and features of the present invention will become apparent to those skilled in the art from the following discussion.

BEST MODE FOR CARRYING OUT THE INVENTION

This invention arose from a desire by the inventor to improve on state of the art technology for pipetting fluids in a laboratory. The present invention provides a safety pipette, a safety pipette insert, and a pipette adaptor which are designed so that the user is prevented from mouth pipetting fluids. In order to utilize the present technology, a user must employ a standard pipetting device to withdraw fluids into a pipette.

In one aspect of the invention, it is provided herein a disposable pipette which comprises a translucent tube provided with first and second ends, the first end being an elongated passageway of substantially smaller diameter than the tube and the second end positioned opposite the first end being vented to permit the passage of air in and out of the tube;

a porous barrier plug mounted in the tube at a position close to the second end thereof;

sealing means operably mounted in the tube at a position between the second end thereof and the barrier plug, said sealing means being capable of adopting at least a closed position, and an open position into which the sealing means must be forced to; and means for closing the sealing means, said closing means being mounted in the tube at a position between the second end thereof and the sealing means, wherein when the first end of the pipette is immersed in a fluid, the sealing means is forced to the open position and the second end is connected to a suction means the fluid is suctioned into the pipette.

This disposable pipette cannot be utilized by itself for pipetting. If mouth pipetting is attempted, no upward flow of fluid will be observed. In order for this pipette to withdrawn fluid from a vessel, it is necessary to mount onto the suction end of the pipette a pipette adaptor which is also part of this invention.

The pipette adaptor provided herein comprises an annular sleeve operably and sealably mounted on the second end of the tube, said sleeve provided with means for forcing the sealing means to the open position, and being open to permit the passage of air in and out of the tube.

When the annular sleeve of the pipette adaptor is mounted onto the suction end of the pipette of this invention, the forcing means moves the sealing means to the open position, thereby permitting the passage of air in and out of the pipette.

In a particularly preferred embodiment of the pipette adaptor, the forcing means is a rod extending vertically into the tube portion of the pipette.

In a particularly preferred embodiment of the disposable pipette of the invention, the sealing means is a circular plate having a diameter smaller than the inner diameter of the tube, wherein when the circular plate is closed against the sealing means, a tight seal is produced that impedes any passage of liquid or gas through the tube.

The circular plate may be movably attached to the tube at one or two points. When attached at two points, the two points are opposite one another.

In still another preferred embodiment, the sealing means is an unattached stopper, wherein when the stopper is displaced towards the sealing means, a tight seal is produced which impedes the passage of liquid or gas through the tube. In a particularly preferred embodiment, the stopper is a sphere such as a plastic sphere.

The closing means provided in the pipette may be a circular rib attached to the tube. However, it may have any other form as long as when the sealing means is displaced towards the closing means a tight seal is attained.

The pipette may be made of any material which is translucent and inert to the liquids that are to be pipetted in the laboratory. Particularly preferred materials are glass and plastics. These materials have been used in the art for the manufacture of pipettes and their compositions or methods of making the pipettes need not be detailed herein.

Figure 3:
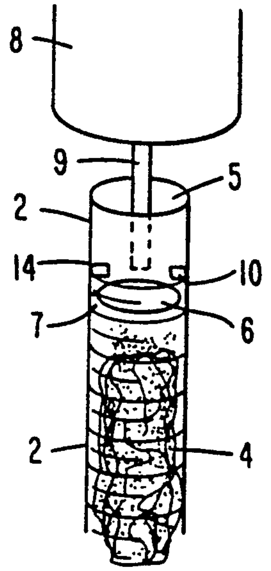
FIG. 3 is a further expanded vertical view of the pipette insert of the invention (2) and the lower end of the pipette adaptor of the invention (8) as it is being inserted into the second end (5) of the pipette insert (2).

The disposable pipette of the invention may be further graduated so that the volume of fluid drawn into it may be ascertained. For example, graduation means may be placed on the tube between the first end and the closing means as shown in FIG. 3.

Also part of this invention is the safety adaptor for a pipette which may be manufactured and sold separately. This adaptor comprises an annular sleeve having an internal diameter capable of being tightly mounted on the suction end of a pipette, said sleeve permitting the passage of air therethrough and being provided with a rod which is positioned in the direction of the sleeve's axis for insertion in the pipette, and being provided with a fitting for connection to a suction means positioned opposite the rod.

Any known materials known as suitable for building adaptors for pipettes may be utilized. Preferred materials for making the sleeve of the adaptor are elastomeric materials, among others.

Still another aspect of the invention provides a disposable pipette insert which comprises a translucent hollow tube provided with first and second ends, a length shorter than a pipette and an outer diameter permitting the tube to sealably fit first end in in the suction end of the pipette with the second end of the tube being flush with said suction end;

a porous barrier plug mounted in the tube at a position close to the first end of the tube and held in such position;

sealing means operably mounted in the tube at a position between the second end thereof and the barrier plug, said sealing means being capable of adopting at least a closed position and an open position into which it must be forced; and means for closing the sealing means, said closing means being mounted in the tube at a position between the second end thereof and the sealing means, wherein when the sealing means is forced into the open position air can flow in and out of the tube.

This disposable insert is similar to the translucent tube described above as part of the disposable safety pipette of the invention. In general, the characteristics provided for the above translucent tube applied to the present pipette insert.

The length and diameter of the translucent tube (pipette insert or the first end of the pipette) can be ascertained from the Figures. Preferably, the diameter is such that it fits inside the suction end of the pipette or alternatively, it is built into the pipette when the latter is manufactured. The length of the tube should only extend through the suction end of the pipette and not interfere with the graduated portion and/or when not graduated, the reservoir portion of the pipette. By means of example, for a 10 ml pipette, the length of the translucent tube may be about 2 to 5 cm, and more preferably about 3 to 4 cm. Similarly, the length of the tube can be determined by an artisan for different volume pipettes. Other lengths, however, may also be utilized as found suitable.

In a preferred embodiment of the invention, the disposable pipette insert is made of an elastomeric material, the porous barrier is glass wool, the closing means is a circular rib, and the sealing means may be a circular plate and/or a stopper such as a spherical stopper which fits tightly against the rib.

Also provided herein are various kits which may be sold in the marketplace.

In one embodiment, a kit is provided herein which comprises at least one disposable pipette insert comprising a translucent hollow tube provided with first and second ends, a length shorter than a pipette and an outer diameter permitting the tube to sealably fit first end in in the suction end of the pipette, with the second end of the tube being flush with said suction end, a porous barrier plug mounted in the tube at a position close to the first end of the tube and held in such position, sealing means operably mounted in the tube at a position between the second end thereof and the barrier plug, said sealing means being capable of adopting at least a closed position and an open position into which it must be forced; and means for closing the sealing means, said closing means being mounted in the tube at a position between the second end thereof and the sealing means, wherein when the sealing means is forced into the open position air can flow in and out of the tube; and at least one safety pipette adaptor comprising an annular sleeve having an internal diameter capable of being tightly mounted on the suction end of a pipette, said sleeve permitting the passage of air therethrough and being provided with a rod which is positioned in the direction of the sleeve's axis for insertion in the pipette, and being provided with a fitting for connecting to a suction means positioned opposite the rod; said pipette insert and pipette adaptor being of compatible sizes.

In one particularly preferred embodiment of the invention, the safety pipette adaptor is not disposable and it may be re-used with several pipettes or pipette inserts in accordance to this invention.

In another preferred embodiment of the kit, one to five safety pipette adaptors are provided therein along with about 1 to 20 dozen disposable pipette inserts, and more preferably 1 to 10 dozen disposable pipette inserts.

In another preferred embodiment, the kit further comprises at least one pipette of a size which is compatible with the pipette insert and the pipette adaptor sizes. When the kit comprises disposable pipettes, the pipettes are provided in an amount of about 1 dozen to 20 dozen, and more preferably about 1 to 10 dozen pipettes.

Also provided herein is a kit, which comprises at least one safety pipette adaptor comprising an annular sleeve having an internal diameter capable of being tightly mounted on the suction end of a pipette, said sleeve permitting the passage of air therethrough and being provided with a rod which is positioned in the direction of the sleeve's axis for insertion in the pipette, and being provided with a fitting for connecting to a suction means positioned opposite the rod; and at least one disposable pipette which comprises a translucent tube provided with first and second ends, the first end being an elongated passageway of substantially smaller diameter than the tube and the second end positioned opposite the first end being vented to permit the passage of air in and out of the tube, a porous barrier plug mounted in the tube at a position close to the second end thereof, sealing means operably mounted in the tube at a position between the second end thereof, and the barrier plug, said sealing means being capable of adopting at least a closed position, and an open position into which the sealing means must be forced to, and means for closing the sealing means, said closing means being mounted in the tube at a position between the second end thereof and the sealing means, wherein when the first end of the pipette is immersed in a fluid, the sealing means is forced to the open position and the second end is connection to a suction means the fluid is suctioned into the pipette, wherein the adaptor and the pipette are of compatible sizes.

The pipette adaptor provided herein by itself or as part of a kit may be disposable or non-disposable. More resilient materials can be utilized for non-disposable pipette adaptors which are somewhat more expensive. These are known in the art and need not be described herein. The kits may be provided in a package such as a sealed bag or box. In a preferred embodiment, the kit components are sterile.

Now, the invention will be further described with reference to the Figures.

FIG. 1 shows a standard pipette held horizontally. The parts of the pipette shown in the Figure are the body (1), the suction end of the pipette (2), or pipetting device attachment and the aspiration/dispensing tapered end (3) of the pipette.

Figure 2:
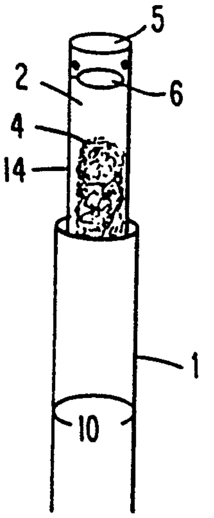
FIG. 2 is an expanded view of the suction end of a standard pipette (1) and the pipette insert of the invention (2).

FIG. 2 is an expanded view of the pipette insert of the invention shown outside of the pipette (1). The parts shown in FIG. 2 are a porous barrier plug such as cutin or glass wool (4), the second end (5) of the translucent tube and the sealing means (6). In this Figure, the pipette insert is in the process of being inserted into the pipette (1). Shown in the Figure is also the closing means (10) mounted in the pipette. The translucent tube (14) must be inserted so that the closing means are positioned between the suction or second end (5) of the translucent tube and the sealing means (6). This is shown in FIG. 3. In this Figure, it is also shown how the pipette adaptor (8) is starting to be inserted in the suction end (5) of the pipette adaptor (14). Shown in the FIG. 3 are the porous barrier plug (4), the circular plate (6) which is an embodiment of the sealing means, the closing means shown as a rib (10) around the inner face of the tube, a tab holding the circular plate onto the pipette insert (2), and the means for forcing (9) the circular plate open.

Figure 4:
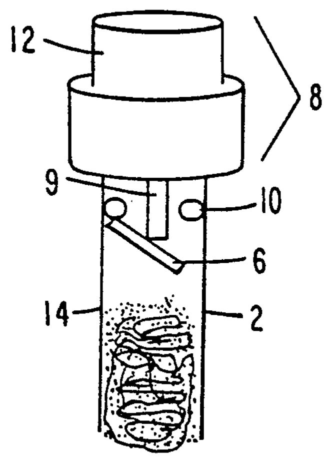
FIG. 4 is a vertical view of one embodiment of the pipette insert (2) with the pipette adaptor (8) inserted therein. This embodiment has a sealing means which is a circular plate (6) shown herein in the open position.
Figure 5:
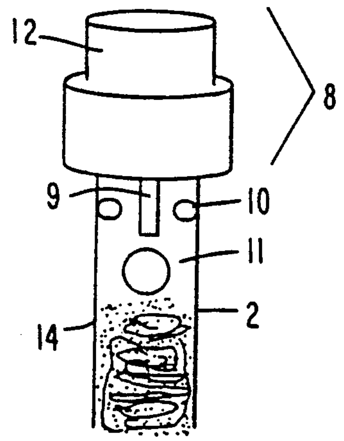
FIG. 5 shows another embodiment of the pipette insert (2) where the sealing means is a spherical stopper (11). The pipette adaptor (8) is shown fully inserted in the pipette insert (14) having forced the spherical stopper (11) into the open position.

FIGS. 4 and 5 show the pipette adaptor being totally inserted into the pipette insert (2). The pipette adaptor (8) is shown to be comprised of a suction end (12) which is hollow and serves as an adaptor for suction means, and the forcing means (9) for opening the sealing plate (6). FIG. 4 shows the pipette adaptor fully inserted into the embodiment of the pipette insert (2) of the invention where the sealing means is a circular plate (6). FIG. 5 shows a fully inserted pipette adaptor (8) which has moved the spherical stopper (11) of the pipette insert (2) into the open position.

Figure 6:
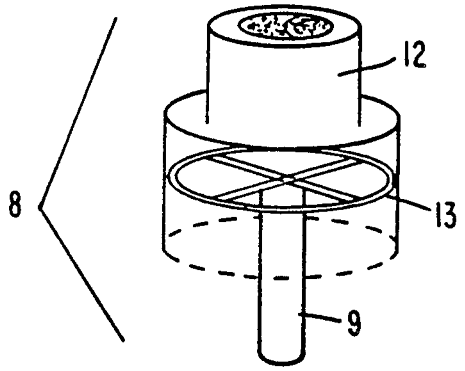
FIG. 6 is another embodiment of the pipette adaptor (8) showing the suction end fitting (12) of the adaptor, the means for forcing the sealing means to the open position (9), and an optional cross-support (13) for the forcing means (9).
Figure 7:
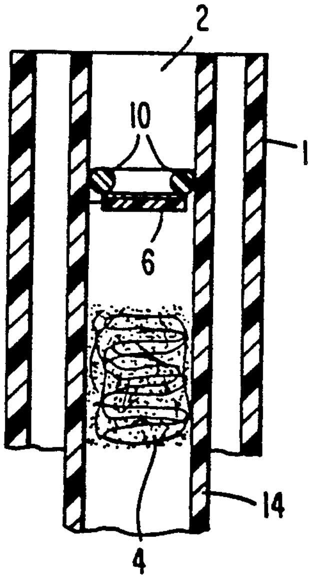
FIG. 7 shows in cross-section an embodiment wherein the disposable pipette insert (2) is inserted in a pipette (1) with the suction ends of the insert and the pipette being flush.

FIG. 6 is an expanded cut-away view of one embodiment of the pipette adaptor of the invention. The Figure shows the suction end fitting (12) of the adaptor, a cross-support (13) for the forcing means in the form of a bar (9). The cross-support (13) is intended for holding the bar (9) in place. The fact that it is not a solid plate is purposely designed so that it will permit the passage of air in and out of the pipette insert (2).

The invention now being fully described, it will be apparent to one of ordinary skill in the art that many changes and modifications can be made thereto with out departing from the spirit or scope of the invention as set forth herein.

I claim:

1. A disposable pipette, comprising a translucent tube provided with first and second ends, the first end being an elongated passageway and the second end positioned opposite the first end being vented to permit the passage of air in and out of the tube;

a porous barrier plug mounted in the tube at a position close to the second end thereof;

sealing means operably mounted in the tube at a position between the second end thereof and the barrier plug, said sealing means being capable of adopting at least a closed position and an open position into which the sealing means must be forced; and means for closing the sealing means, said closing means being mounted in the tube at a position between the second end thereof and the sealing means, wherein when (a) the first end of the pipette is immersed in a fluid, (b) the sealing means is forced to the open position and (c) the second end is connected to a suction means, the fluid is suctioned into the pipette.

2. The pipette of claim 1, wherein the sealing means is a circular plate having a diameter smaller than the inner diameter of the tube, wherein when the circular plate is closed against the closing means, a tight seal is produced that impedes any passage of liquid or gas through the tube.

3. The pipette of claim 2, wherein the circular plate is movably attached to the tube at one point.

4. The pipette of claim 1, wherein the sealing means is an unattached stopper, and further wherein when the stopper is displaced towards the closing means, a tight seal is produced that impedes any passage of liquid or gas through the tube.

5. The pipette of claim 4, wherein the stopper is a sphere.

6. The pipette of claim 1, wherein the closing means comprises a circular rib attached to the tube.

7. The pipette of claim 1, wherein the tube is a transparent plastic tube.

8. The pipette of claim 1, further comprising graduation means placed on the tube between the first end and the closing means.

9. The pipette of claim 1, further comprising an annular sleeve operably and sealably mounted on the second end of the tube, said sleeve provided with means for forcing the sealing means to the open position, and being open to permit the passage of air in and out of the tube.

10. The pipette of claim 9, wherein the forcing means is a rod extending vertically into the tube.

11. The pipette of claim 9, wherein the sleeve is made of an elastomeric material.

12. A kit, comprising at least one disposable pipette as claimed in claim 1; and at least one safety pipette adaptor comprising an annular sleeve having an internal diameter capable of being tightly mounted on the suction end of said at least one disposable pipette, said sleeve permitting the passage of air therethrough and being provided with a rod which is positioned in the direction of an axis for insertion into said at least one disposable pipette, and opposite the rod with a fitting for connection to the suction means wherein said at least one adaptor and said at least one pipette are of compatible sizes.

13. The kit of claim 12, wherein said at least one pipette adaptor is disposable.

14. A safety pipette adaptor, comprising an annular sleeve having an internal diameter capable of being tightly mounted on a suction end of a pipette, said sleeve permitting the passage of air therethrough, being provided with a rod positioned in the direction of an axis for insertion in the pipette, and including a fitting for connection to a suction means positioned opposite the rod, wherein said rod is capable of displacing a sealing means in the pipette into an open position.

15. The safety adaptor of claim 14, wherein the sleeve is made of an elastomeric material.

16. A kit, comprising at least one safety pipette adaptor as claimed in claim 14; and at least one disposable pipette insert comprising a translucent hollow tube provided with first and second ends, a length shorter than a pipette and an outer diameter permitting the tube to sealably fit in a suction end of the pipette, with the second end of the tube being flush with said suction end, a porous barrier plug mounted in the tube at a position close to the first end of the tube and held in such position, sealing means operably mounted in the tube at a position between the second end thereof and the barrier plug, said sealing means being capable of adopting at least a closed position and an open position into which it must be forced, and means for closing the sealing means, said closing means being mounted in the tube at a position between the second end thereof and the sealing means; wherein when the sealing means is forced into the open position, air can flow in and out of the tube, said at least one pipette insert and said at least one pipette adaptor being of compatible sizes.

17. The kit of claim 16, wherein the pipette is of a size which is compatible with the pipette insert and pipette adaptor sizes.

18. A disposable pipette insert, comprising a translucent hollow tube provided with first and second ends, a length shorter than a pipette and an outer diameter permitting the tube to sealably fit in a suction end of the pipette with the second end of the tube being flush with said suction end;

a porous barrier plug mounted in the tube at a position close to the first end of the tube and held in such position;

sealing means operably mounted in the tube at a position between the second end thereof and the barrier plug, said sealing means being capable of adopting at least a closed position and an open position into which it must be forced; and means for closing the sealing means, said closing means being mounted in the tube at a position between the second end thereof and the sealing means, wherein when the sealing means is forced into the open position, air can flow in and out of the tube.

19. The disposable pipette insert of claim 18, wherein the tube is made of an elastomeric material.

* * * * *